United States Patent [19]
Morgan

[11] 3,984,656
[45] Oct. 5, 1976

[54] FOOD HEATING APPARATUS
[75] Inventor: William Thomas Morgan, Port Chester, N.Y.
[73] Assignee: Lawrence Peska Associates, Inc., New York, N.Y. ; a part interest
[22] Filed: June 18, 1975
[21] Appl. No.: 588,032

[52] U.S. Cl. .................................. 219/439; 21/86; 99/417; 219/386; 219/441
[51] Int. Cl.² ........................................ F27D 11/02
[58] Field of Search .............. 21/85, 86, 92, 102 R; 219/385, 386, 387, 421, 429, 430, 432, 438, 439, 441, 442, 521; 99/417; 165/63

[56] References Cited
UNITED STATES PATENTS

| | | | |
|---|---|---|---|
| 1,091,774 | 3/1914 | Shoenberg | 219/441 |
| 1,692,547 | 11/1928 | Evans | 219/386 X |
| 1,860,302 | 5/1932 | Thomas | 165/63 |
| 1,946,573 | 2/1934 | DeVries | 21/86 |
| 2,205,884 | 6/1940 | Greenman | 219/386 X |
| 2,429,512 | 10/1947 | Fuller | 219/438 X |
| 2,555,229 | 5/1951 | Fisher | 219/439 |
| 2,778,921 | 1/1957 | Jepson | 219/439 |
| 3,372,473 | 3/1968 | Price | 219/438 X |
| 3,712,268 | 1/1973 | Reed | 219/385 X |
| 3,859,505 | 1/1975 | Herbrand et al. | 219/433 |

FOREIGN PATENTS OR APPLICATIONS

| | | | |
|---|---|---|---|
| 17,171 | 12/1929 | Australia | 219/438 |
| 448,875 | 6/1948 | Canada | 219/438 |
| 814,328 | 9/1951 | Germany | 219/438 |
| 125,300 | 6/1949 | Sweden | 219/438 |

*Primary Examiner*—Volodymer Y. Mayewsky

[57] ABSTRACT

This disclosure pertains to an apparatus for use in heating containers of food, as in cans, bottles, plastic pouches and the like by emersion into water adapted to insure uniform heating thereof by substantially insulating the containers from thermal contact with all the parts of the heating apparatus except the water in contact with the container. The apparatus can also be used to heat water alone, brew coffee, tea or other beverages.

1 Claim, 3 Drawing Figures

FOOD HEATING APPARATUS

BACKGROUND OF THE INVENTION

1. The Field of the Invention

This invention relates to the art of preparing foods which need not be cooked or heated to temperatures in excess of 212° Fahrenheit by emersion of closed containers of food into water as the heating medium.

2. Description of the Prior Art

Many versions of electrically heated coffee or tea pots or plain water pots are available. None of these currently available devices have the ability to additionally function adequately as a water bath heater for containers of pre-prepared food in either liquid, semi-liquid or solid form.

SUMMARY OF THE INVENTION

The present invention is a multi-purpose food heating device utilized in its simplest form to heat water for later external use or to brew beverages in water by heating and to heat containers of food such as closed containers of cans, jars, baby bottles, plastic pouches of pre-prepared foods and the like.

A primary object of the instant invention is to provide a means of heating closed containers of food.

Another object is to provide a means of heating water in the apparatus.

Still another object is to provide an apparatus capable of heating a multiple number of containers at one time.

A further object is to provide uniform heating at all external surfaces of the container thereby avoiding over-heated and under-heated portions of the food in the best mode available.

Another object is to provide an apparatus capable of providing a simple method of removing the heated containers without endangerment to the user by coming into contact with the hot container.

Still another object is to provide a convenient multi-purpose heating apparatus in pseudo-conventional appearance utilizing electrical heating means.

A further object is a heating apparatus utilizing a power source to utility line voltage as well as automobile batteries and the like.

DESCRIPTION OF THE PREFERRED EMBODIMENTS

The structure and method of fabrication of the present invention is applicable to a water heater complete with a cover or lid and a water pouring spout. An insulating protuberance is permanently affixed to the interior bottom surface of the water compartment. The apparatus has, as an accessory, a food container removal instrument which extends around and below the uppermost surface of the protuberance and is available to the user by emerging beyond the surface of the heating apparatus through a slot in the side outer surface which is located above the aforementioned pouring spout. Another accessory which may be used in combination with the basic heating apparatus and the removal instrument is a thermally insulated container separator constructed in a fashion permitting the water heating medium to exist within and around this accessory whilst mechanically supporting another container.

Figure 1:
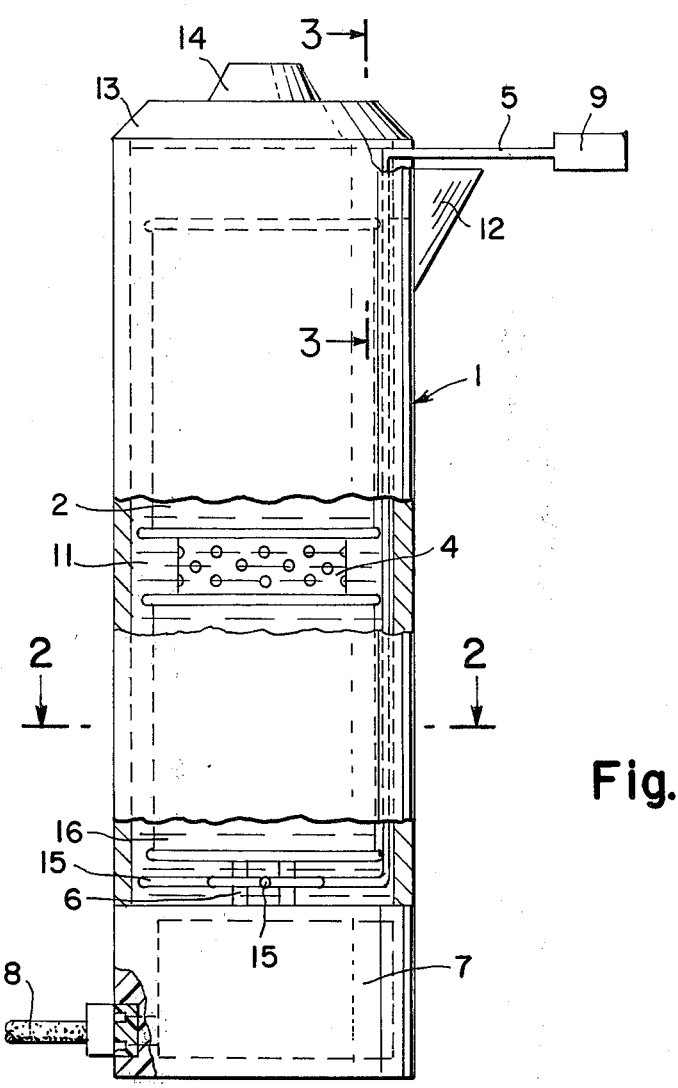
FIG. 1 is a fragmented elevation view of the heating apparatus.

Now referring to the Figures, and more particularly to the embodiment illustrated in FIG. 1 showing the food heating apparatus 1 with an electrical heating device 7 situated below the water compartment 11, an electrical cord 8 is adapted to provide electrical energy from a source not shown. The apparatus 7 is comprised of any conventional electrical heater which may be powered by energy available from wall utility outlets of nominally 120 volts AC or automobile batteries providing energy at nominal voltages of 12 volts, direct current. A selector switch, not shown, may be utilized to prepare the apparatus to accommodate to the appropriate power source or, various models can be adapted to operate at a fixed voltage. Pouring spout 12 is formed or attached near the uppermost edge of the heating compartment 11 and has a series of openings providing communication for the water contained within the compartment. A protuberance 6 is obtained by fastening an insulating material such as polytetrofluoroethlene, commonly called Teflon, a product of E. I. Du Pont de Namours Co., Inc., to the uppermost surface of the floor of the heating compartment. This protrusion serves as a platform to support any rigid container placed within the compartment so that uniform heating is obtained by preventing intimate thermal contact of a substantial nature with the heating apparatus 7. Thus, substantially, the only means of heating is obtained through the use of water or other liquid which couples uniformly the heat generated by the heater to the containers 16 and 2 as shown. In use, the container 16 is inserted into the compartment 11 and water is poured into the compartment.

After a desired period of time the lid 13 is removed by use of the insulating handle 14 exposing a container removal device 5. The device extends over a substantial portion of the cross sectional area internal to the compartment 11 and has radial fingers to accommodate a variety of sizes of food containers. In its rest position the device extends below the uppermost surface of the insulating protrusion 6. A handle 9, comprised of an insulating material, extends beyond the exterior surface of the apparatus heating device and is grasped by the user. The upper edge of the water compartment 11 is provided with a slot extending downwards to a point directly above pouring spout 12 to accommodate vertical removal of the removal device 5. Correspondingly, a vertical slot is cut into the vertical walls of the lid 13 insuring horizontal placement of the lid around the horizontal portion of the removal device. An upward motion raises the container above the liquid level of the heating medium and makes the food container readily available for removal. The horizontal platform created by fingers 15 is fashioned so that the platform can drop below the uppermost surface of the protrusion 6. Another accessory is an insulating spacer 4 which is used to isolate thermally additional food containers when it is desired to heat them. This spacer supports container 2 without substantially upsetting the thermal distribution of heat within the water heating medium by virtue of its low thermal mass and the ability to allow the water to circulate around and through it.

Figure 2:
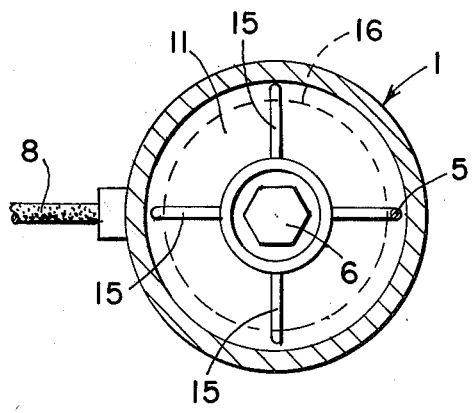
FIG. 2 is a cross section taken through line 2—2 of FIG. 1 looking in the direction of arrows 2—2 illustrating the interior plan view of the bottom of the apparatus claimed.

FIG. 2 illustrates how a container 16 rests upon the fingers 15. The protrusion 6 is shown to emerge through an area centrally located within the removal device 5.

Figure 3:
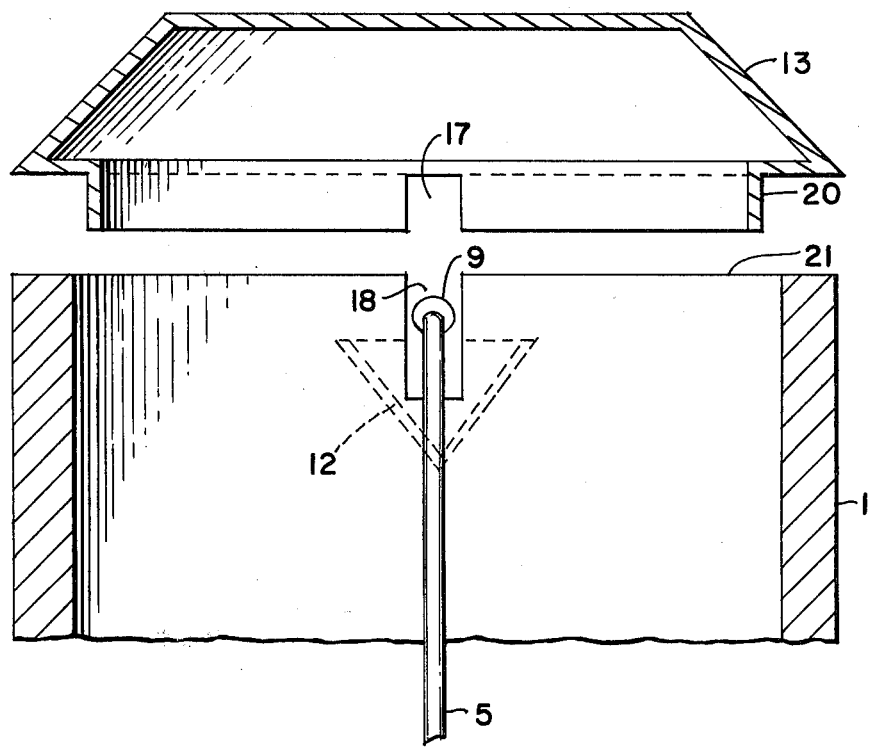
FIG. 3 is a cross-section taken through line 3—3 of FIG. 1 viewed in the direction of arrows 3—3 illustrating the interior elevation view of the upper portions of the apparatus, lid, and removal device claimed.

FIG. 3 illustrates lid 13 displaced upwardly from the food heating apparatus 1 and having a slot 17 cut in a portion of food heating apparatus engaging rim 20. Slot 18 extends downwardly from the uppermost rim 21 of food heating apparatus 1. The horizontal portion of food removal device 5 resides in slot 18 adjacent handle 9. Spout 12 is aligned directly below slot 18.

Thus water surrounds the entire exterior surface of one or more closed food containers. The heating affect of the water is uniform upon these external surfaces and there is virtually no temperature differential between supporting elements of the heating device and the containers to be heated within it. The device can be utilized in conventional fashion to heat water and brew beverages by the removal of insulating spacer accessory 4 and the food container removal device 5.

One of the advantages of this apparatus is a simple, inexpensive means of heating closed containers of food.

Another advantage lies in the additional ability of the apparatus to heat water or brew beverages.

A further advantage includes the ability to heat more than one food container at one time.

Still another advantage pertains to uniform heating of the entire external surface of the food container creating substantially uniform heating of the contents therein.

Another advantage lies in the use of a convenient removal device which can be stored within the heating apparatus.

A further advantage pertains to the ability of the heating apparatus to serve many heating purposes yet appearing to be conventional in its construction and utilizing electrical energy as a means of heating.

Still another advantage is in the ability of the electrical heating mechanism to be utilized at various voltage levels for the electrical source of energy supplied thereto.

Thus, there is disclosed in the above description and in the drawings embodiments of the invention which fully and effectively accomplish the objects thereof. However, it will be apparent to those skilled in the art, how to make variations and modifications to the instant invention. Therefore, this invention is to be limited not by the specific disclosure herein, but only by the appending claims.

The embodiments of the invention which are exclusive privilege or property is claimed and defined as follows:

1. A heating device for food comprising a hollow right angle cylinder container, electrical heating means, said electrical heating means fastened below the bottom surface of said container, a vertical protrusion, said vertical protrusion fixedly secured to an uppermost surface of said bottom surface of said container, said vertical protrusion comprised of a plastic material possessing low thermal energy transmission characteristics, said container comprised of a material dissimilar to said plastic material and possessing substantially higher thermal energy transmission characteristics relative to said plastic material, a pouring spout, a first slot, said container having an open mouth, said first slot extending downwardly from the uppermost edge of said open mouth, said first slot piercing through said uppermost edge, said pouring spout fixedly secured to the external surface of said container, said pouring spout having an innermost surface adjacent said external surface of said container, said innermost surface of said pouring spout being disposed intermediate said first slot and said uppermost surface of said bottom surface of said container, said pouring spout having open edges adjacent said external surface of said container, said open edges of said pouring spout disposed straddling the width of said first slot, a food removal device, said food removal device having a first portion being disposed within said container, said first portion being disposed in a horizontal plane below the uppermost surface of said protrusion, said food removal device having a second portion, said second portion fixedly secured to said first portion, said second portion extending substantially normal to said horizontal plane and adjacent to the interior surface of said container, said food removal device having a third portion, said third portion fixedly secured to the uppermost end of said second portion and extending radially outwardly therefrom, a portion of said third portion residing in said first slot and extending radially outwardly from said external surface of said container, a lid for covering said open mouth, said lid having a vertical wall extending downwardly therefrom, a second slot, said second slot being disposed in said vertical wall, said second slot piercing the lowermost edges of said vertical wall, said second slot being disposed about said portion of said third portion of said food removal device permitting the passage of said portion of said third portion of said food removal device therethrough when said vertical wall of said lid is disposed within said open mouth.

* * * * *